United States Patent
Mauger

(10) Patent No.: US 7,023,860 B1
(45) Date of Patent: *Apr. 4, 2006

(54) COMMUNICATIONS NETWORK

(75) Inventor: Roy Harold Mauger, Radlett (GB)

(73) Assignee: Nortel Networks Limited, St. Laurent (CA)

( * ) Notice: Subject to any disclaimer, the term of this patent is extended or adjusted under 35 U.S.C. 154(b) by 982 days.

This patent is subject to a terminal disclaimer.

(21) Appl. No.: 09/624,123

(22) Filed: Jul. 24, 2000

(30) Foreign Application Priority Data

Jan. 17, 2000 (GB) .................................... 0001040

(51) Int. Cl.
*H04L 12/28* (2006.01)

(52) U.S. Cl. .................................... 370/401; 370/395.1

(58) Field of Classification Search ........ 370/351–356, 370/386–392, 395.1, 396, 395.2, 395.21, 370/395.3, 395.5, 395.51, 395.52, 395.6, 370/400–409, 397, 399, 395.42, 395.43; 709/238, 223

See application file for complete search history.

(56) References Cited

U.S. PATENT DOCUMENTS

| | | | |
|---|---|---|---|
| 6,205,488 B1 * | 3/2001 | Casey et al. ................ | 709/238 |
| 6,434,612 B1 * | 8/2002 | Hughes et al. .............. | 709/223 |
| 6,477,166 B1 * | 11/2002 | Sanzi et al. .............. | 370/395.1 |
| 6,493,349 B1 * | 12/2002 | Casey ........................ | 370/409 |
| 6,538,991 B1 * | 3/2003 | Kodialam et al. .......... | 370/229 |
| 6,631,128 B1 * | 10/2003 | Lemieux ..................... | 370/351 |
| 6,633,571 B1 * | 10/2003 | Sakamoto et al. .......... | 370/401 |
| 6,765,921 B1 * | 7/2004 | Stacey et al. .............. | 370/401 |
| 6,886,043 B1 * | 4/2005 | Mauger et al. ............. | 709/238 |

* cited by examiner

*Primary Examiner*—Dang Ton
*Assistant Examiner*—Phuc Tran
(74) *Attorney, Agent, or Firm*—Barnes & Thornburg LLP

(57) ABSTRACT

The invention provides a plurality of core nodes establishing a multi-service transport network, and service nodes each coupled to a core node for providing access to the transport network. A network management system is arranged to define and manage one or more virtual public/private networks within the communications network. Groups of core nodes are configured as abstract nodes within which any available path may be selected to achieve a requested connection. End to end label switched paths are established via the management system by specifying a series of abstract nodes.

22 Claims, 9 Drawing Sheets

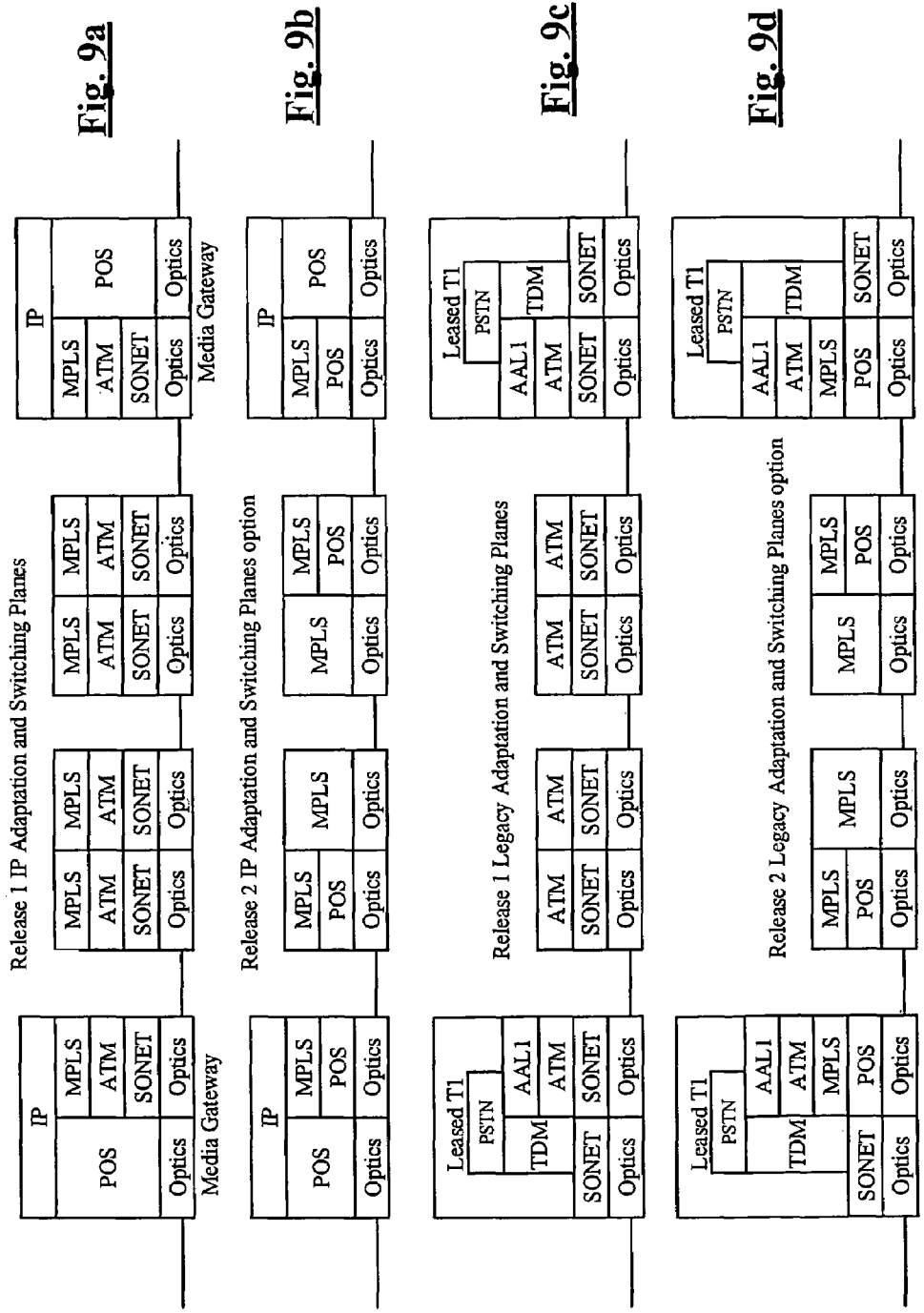

COMMUNICATIONS NETWORK

FIELD OF THE INVENTION

This invention relates to arrangements and methods for the switching or routing of traffic in a communication network.

BACKGROUND OF THE INVENTION

Traditionally, two types of legacy telecommunication networks have been developed. The first type of legacy network is connection oriented and is used for the transport of narrow band voice traffic, typically carried in TDM frames. Such networks comprise for example synchronous or plesiochronous networks. The second type of legacy network is connectionless in nature and is used for the transport of broad band packet or cell-based data traffic. Such packet traffic includes for example Internet protocol (IP) traffic. There is currently a drive towards unified networks which provide end to end transport for both voice and data services, and to this end the use of asynchronous transport has been introduced. This of course introduces the problem of supporting different protocols over a common network.

Asynchronous Transfer Mode (ATM) is the technology specified by the ITU-T as a broadband network technology suitable for all applications. For Internet protocol traffic however, ATM has proven to be less than fully effective at supporting Layer 3 routed applications, such as routed virtual private networks. This has led the IRTF (Internet Research Task Force) to specify multi-protocol label switching (MPLS) as a technology which inherits the desirable characteristics of ATM but is better matched to the Internet protocol. In particular MPLS provides a frame merge function in which data frames received from multiple sources are captured and sent out with a common label. This is required for the support of Internet Protocol Layer 3 Routed services. Service providers would ideally prefer a single network technology to support all of the services that they provide as this would achieve the lowest possible operational cost.

A particular problem with the introduction of a multi-service network is that of accommodating the various transport protocols and, in particular, that of providing end to end quality of service guarantees for high priority traffic such as voice. In particular, there is a need to provide a network that can carry both data and voice traffic at a local, national and international level while utilising a common transport protocol. A further problem with such a network is that of real time management of the virtual public/private networks that are established within the network. At present, each VPN manager requires a detailed knowledge of the network topology. In a large network this is a very significant operational task.

Reference is here directed to Multiservice Switching Forum Contribution Number: MSF 99.245 (Multiservice Switching Forum System Architecture Implementation Agreement) available at www.msforum.org, the contents of which are incorporated herein by reference.

SUMMARY OF THE INVENTION

An object of the invention is to minimise or to overcome the above disadvantage.

According to a first aspect of the invention, there is provided a communications multi-service network comprising a plurality of nodes interconnected via quality of service capable tunnels and incorporating a frame-mode MPLS architecture whereby IP services are run directly over a frame-based core network and legacy services are run over ATM adaptations and emulated ATM services.

According to a further aspect of the invention, there is provided a method of operating a communications multi-service network comprising a plurality of nodes interconnected via quality of service capable tunnels, wherein ATM is used for low or medium capacity access, and wherein frame mode is used frame-mode is used for access to corporate users and for core transport.

According to another aspect of the invention, there is provided a communications network comprising a plurality of core nodes establishing a transport network, service nodes each coupled to a said core node to provide access to the transport network, and a network management system arranged to define and manage one or more virtual public/private networks within said communications network, wherein groups of said core nodes are configured as abstract nodes within which abstract nodes any available path may be selected to achieve a requested connection, and wherein end to end label switched paths are established via the management system by specifying a series of abstract nodes.

Advantageously, a virtual private/public network is defined with multiple stages of constraint-based routed label switched paths.

MPLS has been defined by the IETF so as to be independent of the underlying transport mechanism. Mappings on to ATM have been defined as well as frame-mode networks using HDLC (High-Level data link control) based or other forms of frame transport.

MPLS includes the concept of stacked labels. We have found that this allows the networks described herein to operate at multiple layers. For instance a first label in the stack can relate to a traffic trunk. A switch which only swapped this first label would handle the traffic trunk transparently. A switch which popped the first label, swapped the second label and pushed a new first label would be switching a service instance between two traffic trunks. A set of such traffic trunks allocated to a service sub-network and switching by swapping the second label, provides an equivalent of the MSF virtual switch concept. However, in the MPLS case, virtual switches are only visible at designated service nodes as their traffic trunks pass transparently through core nodes.

The ATM Forum has defined a mechanism for the transport of ATM over HDLC (High-Level Data Link Control) based frame-mode transport and has engaged on an activity to specify the use of this mechanism in frame-based MPLS networks. In particular the methods for mapping ATM services and traffic contracts onto their MPLS equivalents will be specified.

The arrangement and method enable the definition of a frame-mode MPLS version of the MSF architecture, in which, IP services can run directly over the frame-based core network and legacy services can run over ATM adaptations and emulated ATM services.

The network architecture may be mapped onto the MSF architectural model, and in particular adapts the use of constraint-based routed label distribution protocol (CR-LDP) to simplify the task of super-ordinate and sub-ordinate network management.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the accompanying drawings in which:—

FIGS. 9a to 9d shows comparisons between adaptation and switching plane functions for preferred embodiments of the invention and for legacy networks.

DESCRIPTION OF PREFERRED EMBODIMENTS

Figure 1:
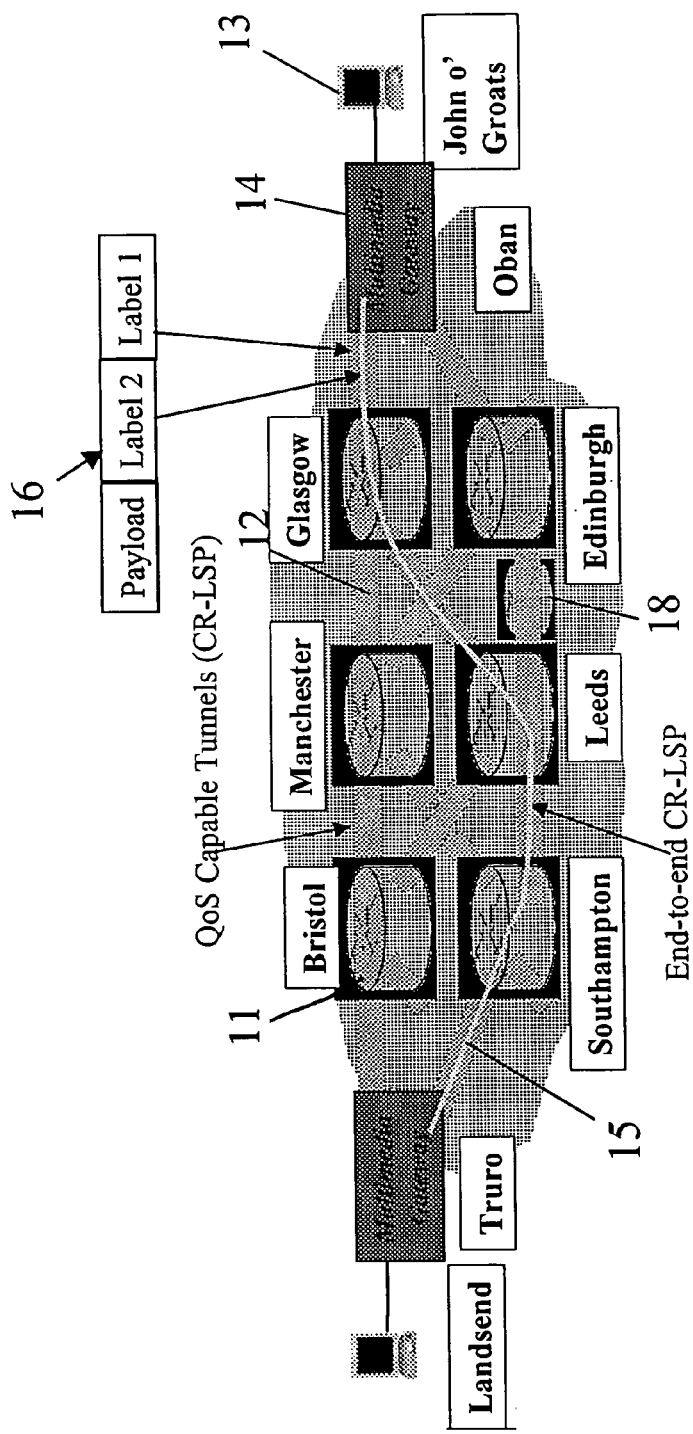
FIG. 1 is a schematic diagram of an exemplary virtual public/private network according to a preferred embodiment of the invention.

Referring first to FIG. 1 this figure illustrates in highly schematic form an exemplary virtual public/private network (VPN) deployed nationally or regionally in order to provide session switched multimedia services on a territorial basis. The network comprises a number of service nodes 11, located at the main centres of population, inter-linked via a network of core nodes by quality-of-service (QoS) capable tunnels 12. The construction of the core network will be described below. In FIG. 1 only one core node 18 is shown in the interests of clarity. Access to the network from user terminals 13 is provided via media gateways 14 each serving to one or more service nodes. Traffic is transported on constraint-based routed label switched paths (CR-LSP) 15 established between respective gateways. The network carries packet traffic, each packet 16 comprising a payload and first and second labels (Label1, Label2) indicative of the path over which the packet is to be routed.

CR-LSPs (constraint based label switched paths) are deployed between the service nodes. Services such as interactive voice, requiring strict QoS guarantees are supported by end-to-end CR-LSPs 15 as illustrated in FIG. 1. To take a simple example of QoS support, if all of the CR-LSPs at both traffic-trunk level and end-to-end are constant bit rate, then the performance of the end-to-end CR-LSP can be substantially equivalent to ATM-AAL1 (asynchronous transfer mode adaptation layer one) assuming 48-byte packetisation.

In our arrangement, the MPLS, the CR-LDP protocol is used to establish the constraint-based routed label switched paths (CR-LSP). These are point-to-point paths between designated nodes that are assigned a traffic contract which, in suitable carrier strength implementations, will be policed for conformance. Such a CR-LSP has an LSPID (label switched path identifier) which can be used to specify a hop in a CR-LDP request. In such a case the new CR-LSP will be multiplexed into the specified CR-LSP and allocated a second level label. This concept is used to specify a virtual public/private network (VPN) with multiple stages of first level CR-LSPs and to provide end-to-end services having a CR-LSP traffic contract. It is also possible to use GSMP to switch between pairs of labels to achieve the same effect as Virtual Switch control in Release 1. In the network of FIG. 1, GSMP control or CR-LDP control of the two-label stack can be employed depending on the service objective.

A feature of the CR-label distribution protocol (CR-LDP) employed herein is the use of an "abstract node" to define routing constraints. An abstract node consists of a sub-network of real nodes (core nodes) over which CR-LDP is allowed to select any available path to achieve the requested connection. Thus in a path specified as (real node A-abstract node B-abstract node C-real-node D) there may be multiple nodes in each of the abstract nodes, there may also be multiple trunks between the abstract nodes. This simplifies the management of a VPN as the network manager only requires a view of the network at the abstract node level and does not require detailed view of the construction or internal operation of an abstract node.

Figure 2:
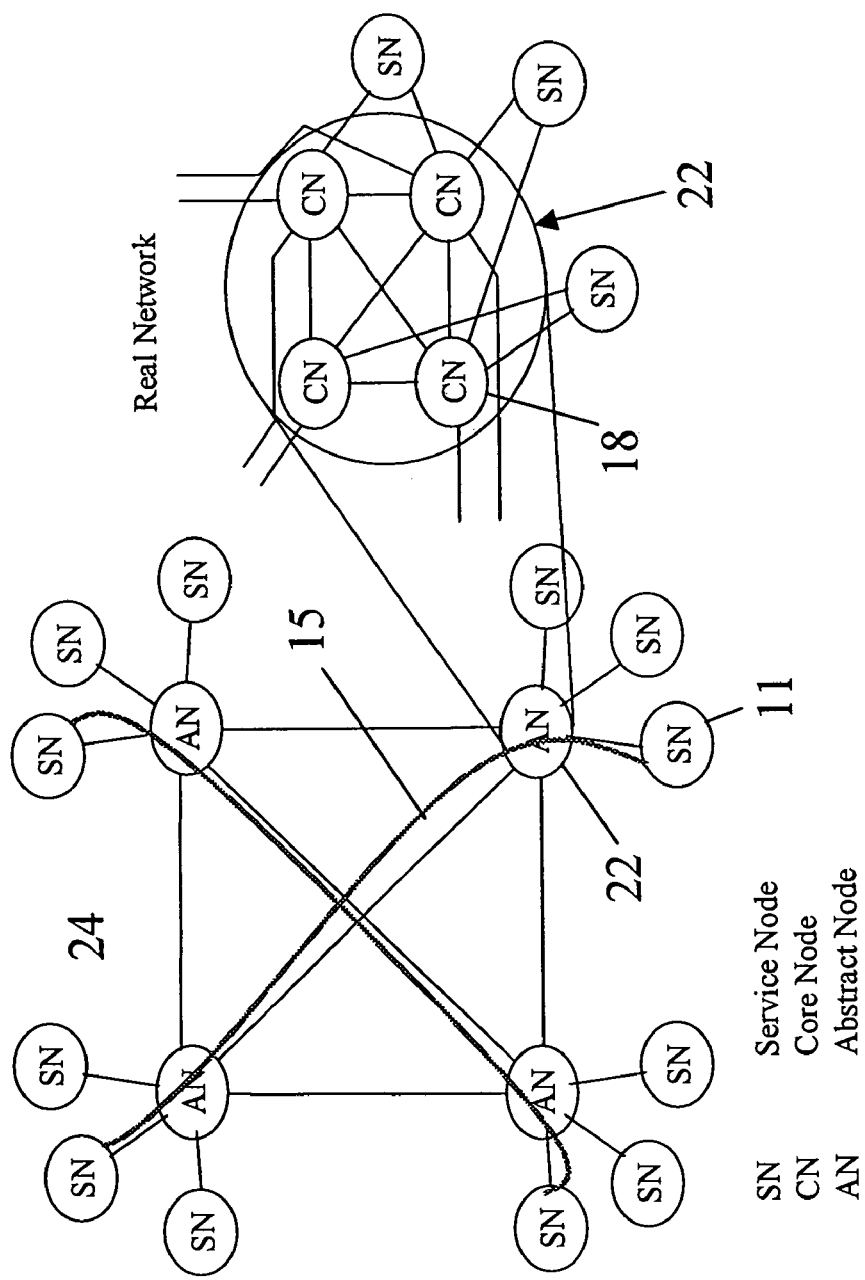
FIG. 2 shows the construction of an abstract node employed in the network of FIG. 1 and illustrates the network construction in further detail.

Referring now to FIG. 2, this depicts in schematic form a portion of the network of FIG. 1. FIG. 2 is a representation of a simple network in its abstract node form, together with a possible real network version of one of the abstract nodes.

The network represents groups of multiple service nodes (SN) 11 each arranged around a respective abstract node (AN) 22 in each of four locations. One of the abstract nodes 22 is shown in detail to illustrate its construction from a sub-network of four core nodes (CN) 18 with multiple transport links 24. In the network of FIGS. 1 and 2, an abstract node is defined by an IP address prefix, and all core nodes which include that prefix in their IP address are part of the abstract node. It will of course be understood that an abstract node may be constructed from some other number of core nodes. Further, abstract nodes can have a temporary, semi-permanent or permanent existence depending on the network requirements.

Constraint based routed label switched paths 15 are deployed between service nodes 11 via the intervening abstract nodes 22.

In the arrangement of FIGS. 1 and 2, it is relatively simple for a management system controlling the real network to produce an abstract node version of its information model for use on a super-ordinate network manager. It is also easy to produce a graphical representation of such a network and to specify traffic trunks by drawing paths between service nodes passing through abstract nodes. These graphical paths can then be used to automatically construct CR-LDP requests to establish the traffic trunks. CR-LDP can run on an existing constraint-based routed label switched path (CR-LSP) to renegotiate the traffic contract so the scheme provides for near real-time creation of VPNs as well as flexible service level agreements which can be modified on a diurnal basis or on any basis which suits the customer traffic profile.

Figure 3:
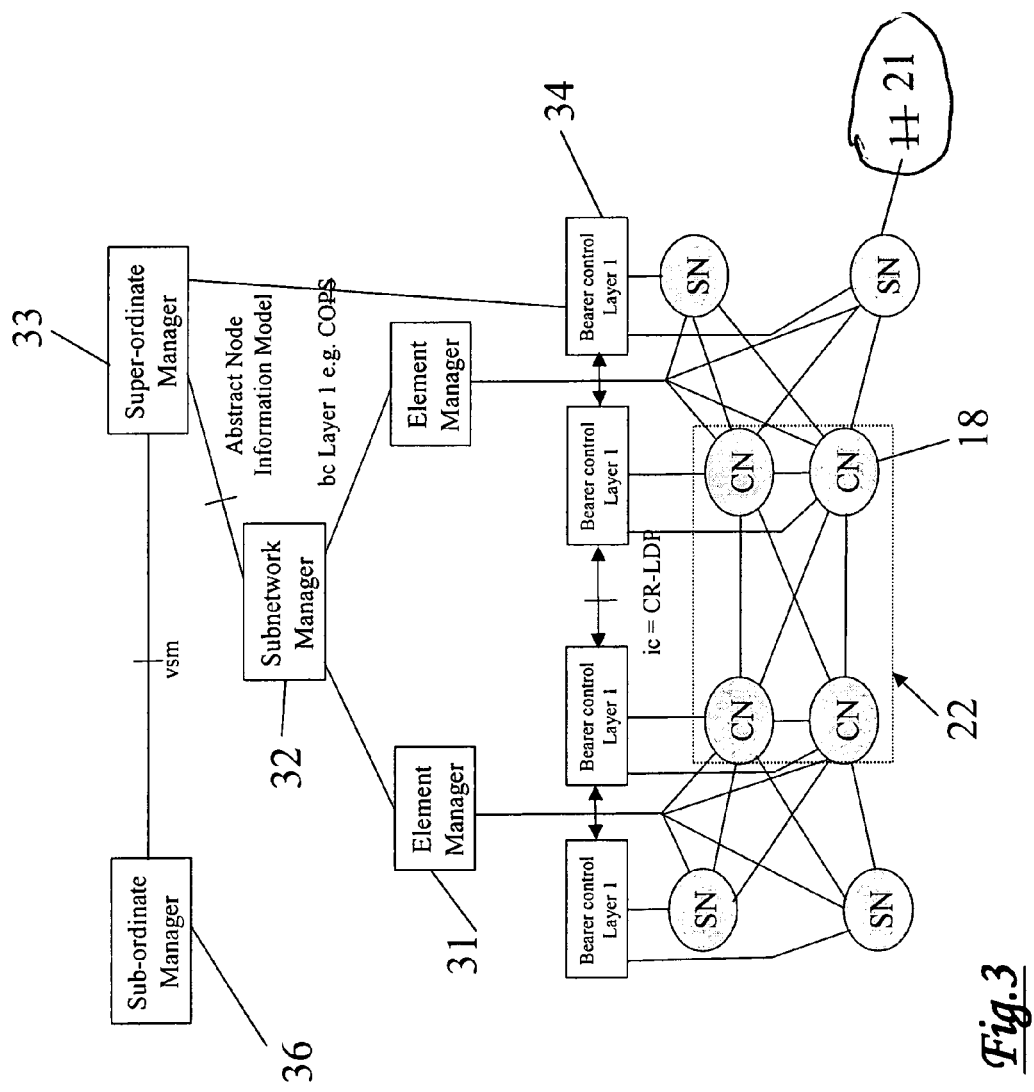
FIG. 3 shows an exemplary Layer 1 management and bearer control architecture.

A management and bearer control function for the layer 1 physical network of FIGS. 1 and 2 is illustrated in FIG. 3. This figure shows by way of example a simple network based on core nodes 18, constituting an abstract node 22, and service nodes 21. The real network has a management system based on a hierarchical structure of element managers 31 and (sub) network managers 32. The (sub) network manager 32 is responsible for constructing the abstract node information model representation of the network which it passes to a super-ordinate manager 33. A sub-ordinate manager 36 provides virtual switch management to perform fault, configuration, accounting, performance, and security management. The super-ordinate manager 33 is used for defining VPNs and placing traffic trunks to realize those VPNs. The super-ordinate manager also creates, modifies and deletes virtual switches. Traffic trunk requests are passed to bearer control Layer 1 (34) to initiate the CR-LDP process, this is the bc reference point for Layer 1 for which the common open policy service protocol (COPS) is preferred. The Layer 1 bearer control function 34 could in some applications be de-coupled from the physical switch using a VSC (virtual switch control) reference point general switch management protocol (GSMP) interface.

Figure 4:
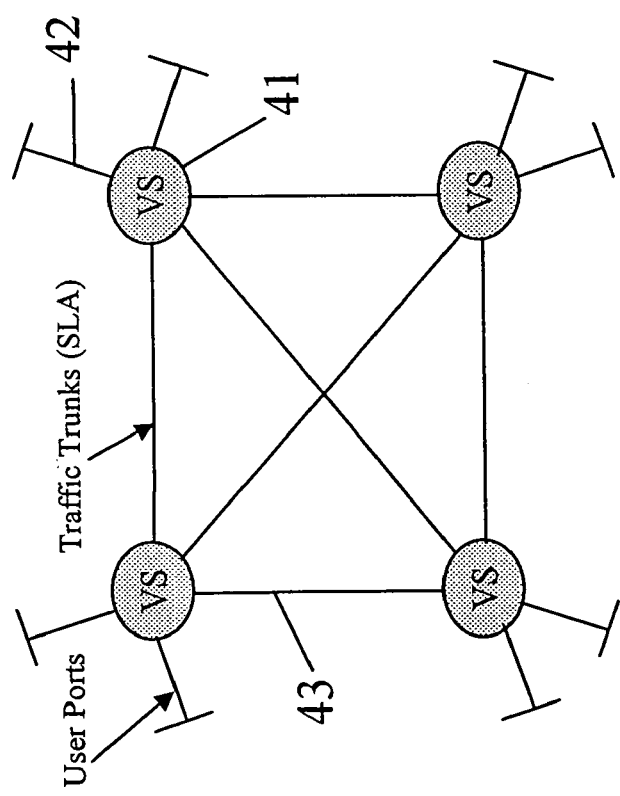
FIG. 4 illustrates a virtual public/private network information model.

The information model illustrated in FIG. 4 for the sub-network manager 32 is also simplified in that only the Layer 2 virtual switches (VS) 41 are visible. These virtual switches are configured with access ports 42 to which users are connected and traffic trunks 43 configured end-to-end and provisioned with SLAs.

As the VPN is only visible at service nodes, then the Layer 2 bearer control function need only be applied at service nodes. For the end-to-end high QoS CR-LSPs discussed above there are two possibilities for controlling the connection. These are CR-LDP as discussed above or GSMPv3.

Figure 5:
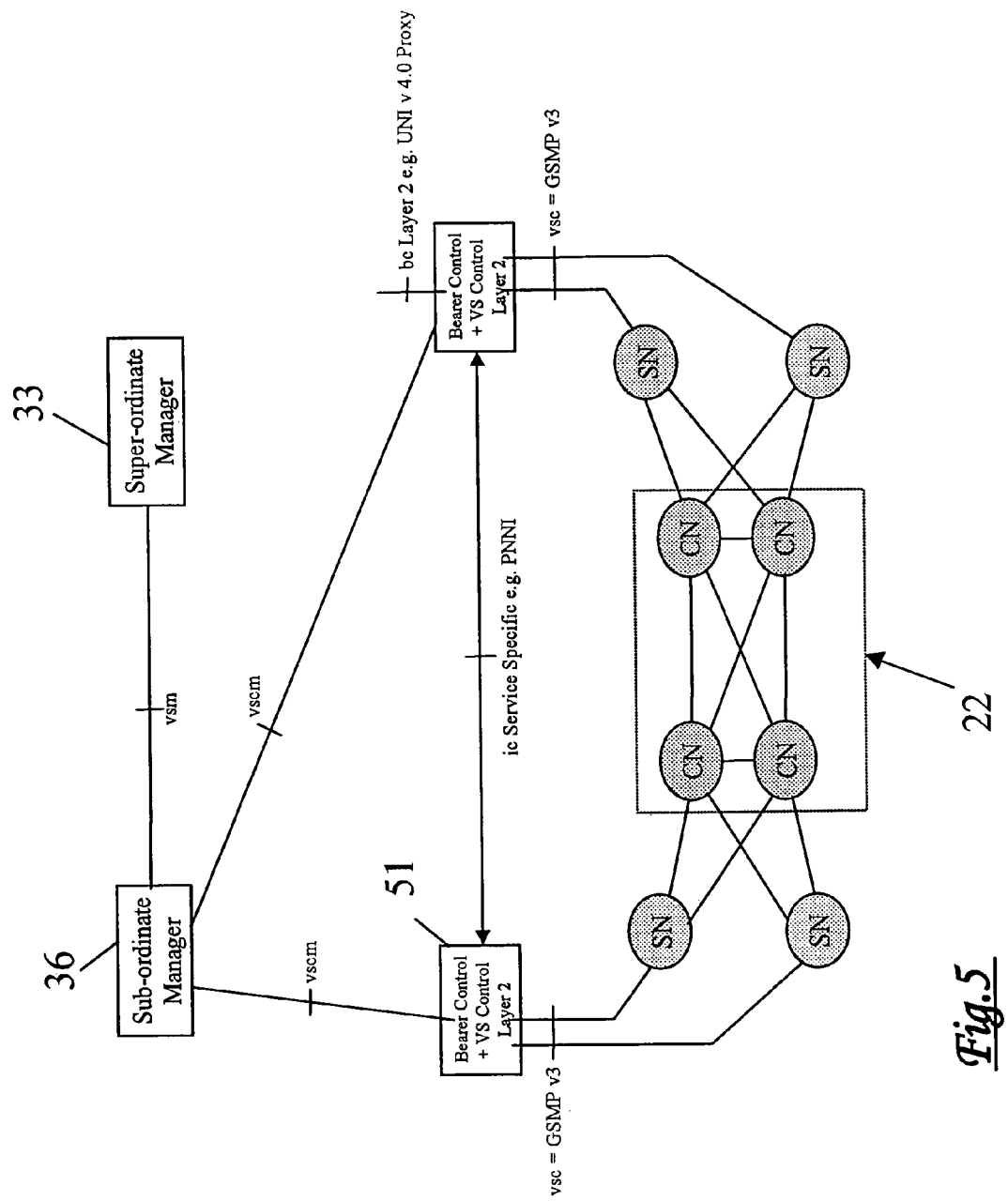
FIG. 5 illustrates a Layer 2 management and bearer control architecture.

This is illustrated in FIG. 5 in which the bearer control Layer 2 (51) is shown using GSMPv3 at the VSC reference point, private network—network interface (PNNI) at the inter-MSS bearer control signalling (IC) reference point, and UNI v 4.0 Proxy at the bearer control (BC) reference point.

Figure 6:
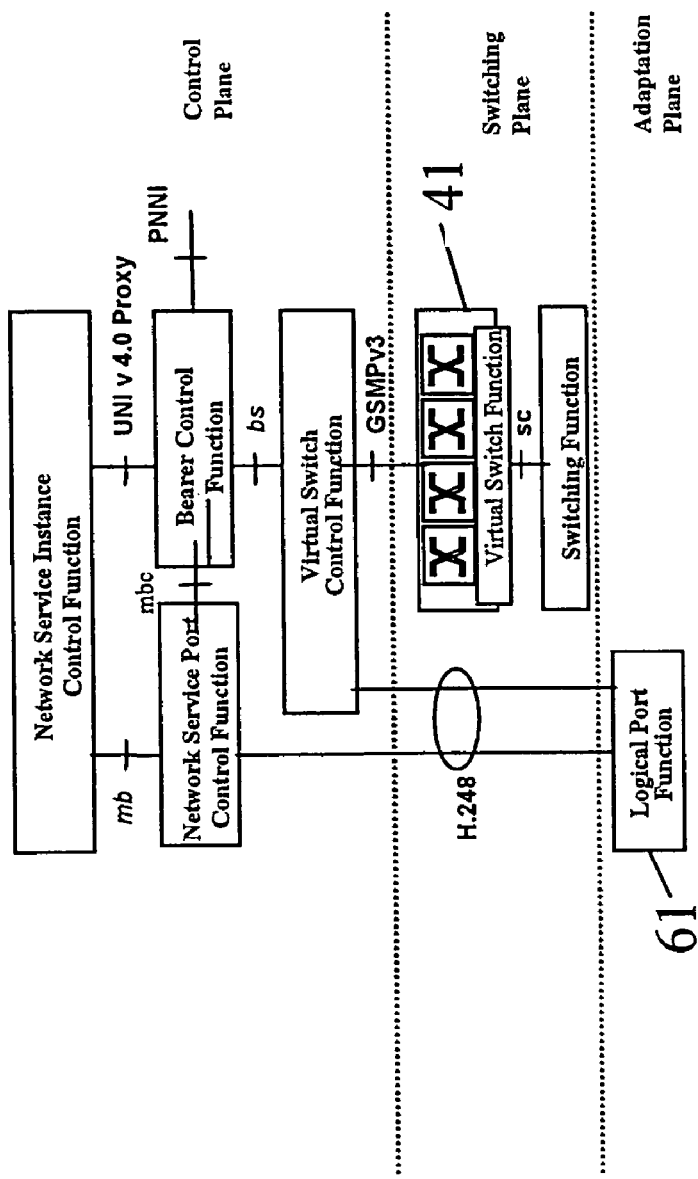
FIG. 6 illustrates the construction of a service node supporting ATM SVC service.

For the bearer control Layer 2 there are a number of candidates, some options will be considered below in the context of the following:—
ATM SVC service network
Leased-line service network
SIP based session-switched multimedia service network A service node providing ATM SVC service with its associated control functions are shown in FIG. 6. Referring to FIG. 6, the logical port function 61 in the adaptation plane provides adaptation from an ATM adaptation function to an end-to-end CR-LSP. Advantageously, General Switch Management Protocol (GSMP) is used on the VSC reference point in order to cross-connect the end to end CR-LSP between input and output traffic trunks of the virtual switch 41 in the switching plane. H.248 protocol may be used to configure an ATM adaptation function in the logical port 61, to establish the end-to-end CR-LSP in the media gateway and to cross-connect the adaptation function with the end-to-end CR-LSP. UNI v 4.0 Proxy and PNNI are used at the BC and IC reference points as discussed above.

Figure 7:
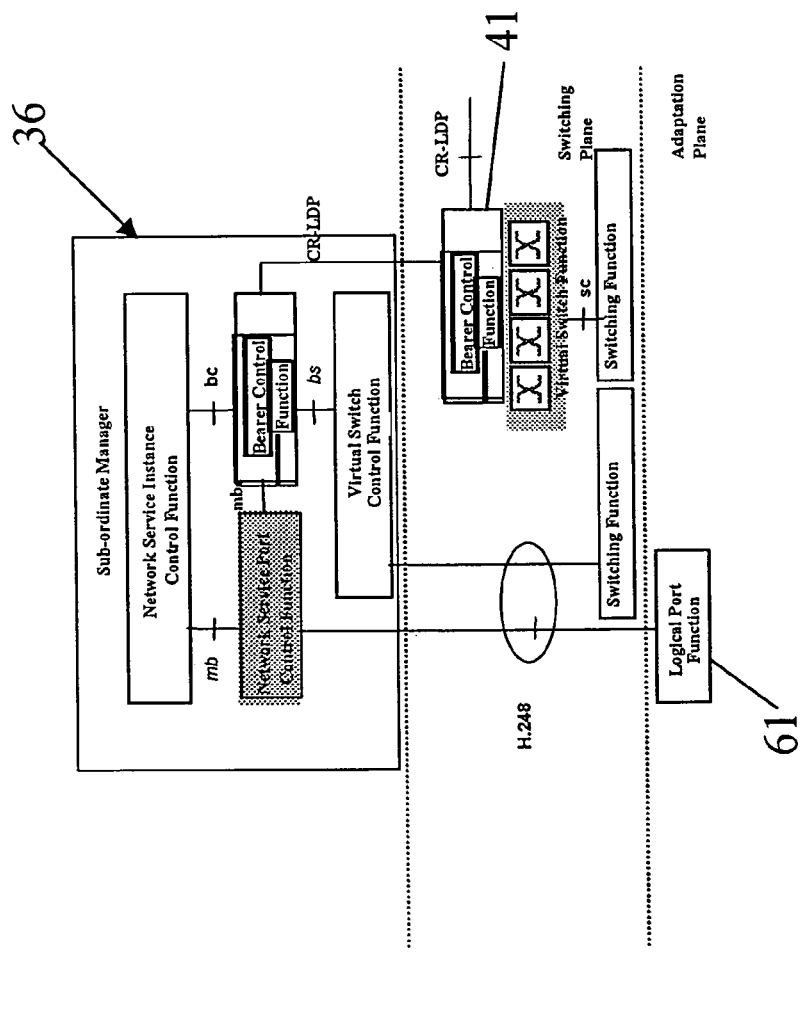
FIG. 7 illustrates the construction of a service node supporting leased-lines.

In the case of a leased-line service network, the sub-ordinate manager 36 (FIG. 7) subsumes all of the functions in the control plane. Sub-ordinate manager 36 is able to use CR-LDP embedded in the network to control the virtual switch 41 implicitly by specifying the series of traffic trunks that the sub-ordinate manager wishes to use for the end-to-end connection. It then uses e.g. H.248 to configure an appropriate adaptation function and cross-connect this to the end-to-end CR-LSP. This procedure is illustrated schematically in FIG. 7. This sub-network manager could advantageously represent the whole virtual network as an abstract node, in which case end-to-end routing is fully controlled by the embedded CR-LDP function.

Figure 8:
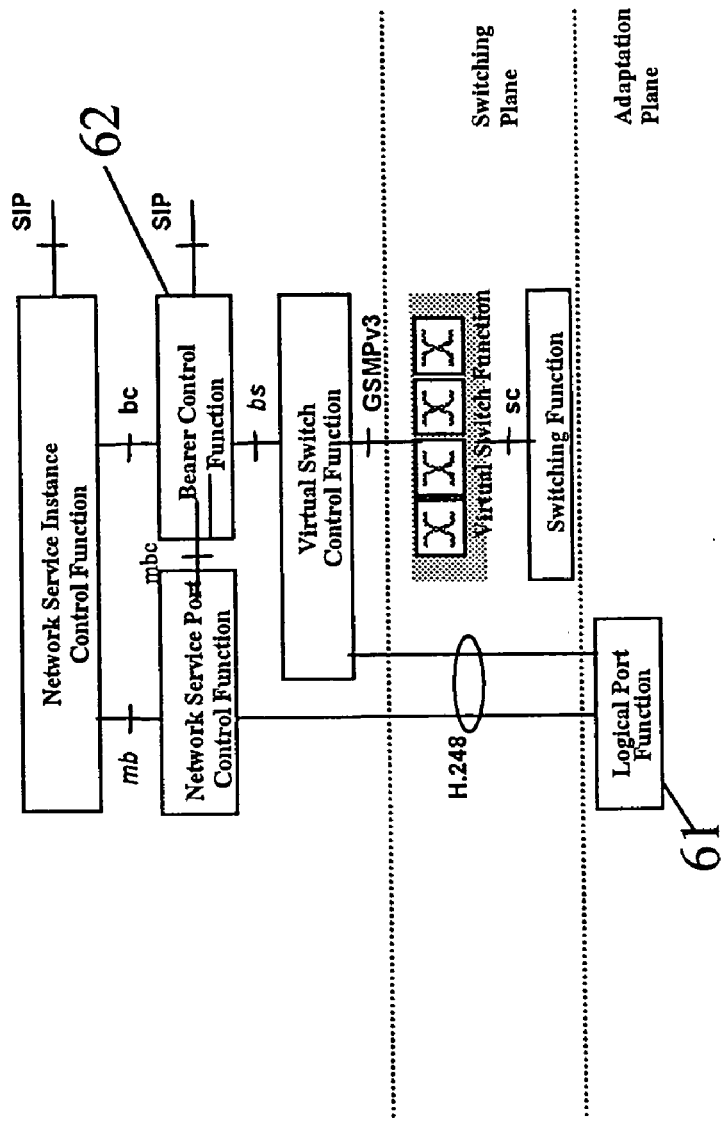
FIG. 8 illustrates the construction of a service node for SIP session-switched services.

For the SIP based session-switched service network a proposal has been made to the IETF to consider Session Initiation Protocol (SIP) as a bearer control protocol for managing end-to-end CR-LSPs. The advantage of deploying SIP in this application is that it is able to explore multiple paths in parallel and to record the route taken. In the referenced document the recorded route of the preferred path is then used to initiate CR-LDP using COPS over the SP reference point, this is consistent with existing MPLS standards but in fact leads to a bearer control which requires two round trips of signalling to execute a connection. A preferred approach would be to use SIP at the IC reference point and GSMP at the VSC reference point which could execute a connection with a single signalling round trip. This preferred approach is illustrated in FIG. 8.

In this case the logical port function 61 is constituted by a packet relay such as a Firewall. Preferably, H.248 is used to configure firewall functions such as PPP or L2TP terminations, network address translators, etc. H.248 is also used to establish the end-to-end CR-LSP in the media gateway and to cross-connect the corresponding IP ports to the end-to-end CR-LSP for real-time services. For web access services the logical port function would provide a proxy for secure access to the Internet; this is not shown. GSMP is used over the VSC reference port to control the virtual switch. SIP is used over the IC reference point to interrogate multiple paths. Multiple invites are received at the destination bearer control function but only one OK message is sent on the preferred path. This can trigger the GSMP function on the intermediate virtual switches to complete the connection. SIP is also used on the ia interface as implied by the service node definition. SIP can also be used to provide the equivalent function to the topology state packet in PNNI so that the bearer control function 62 can be aware of remote congestion points in the network and take avoiding action. Further the bearer control function can also act as a sub-ordinate management function. To do this, the bearer control function acts as a relay point for the COPS messages from the super-ordinate manager to the Layer 1 bearer control function and exchanges topology and state information with other parts of the distributed bearer control function.

Frame-mode transport is considered to be ahead of ATM transport i.e. OC192/STM64 versus OC48/STM16 for line speed operation. Clearly four such OC48/STM16 trunks may be multiplexed up for transport at OC192/STM64 but line-speed operation provides the simplest architecture. Depending on assumptions about traffic mix, then frame-mode transport is somewhat more efficient than ATM transport as illustrated by way of example in the following table. For 20% Legacy and 80% IP the MPLS Core is approximately 10% more efficient than an ATM Core.

TABLE 1

| IP Packet (bytes) | % of Total Packets | IP/ MPLS/POS | Legacy/ ATM/ MPLS/ POS | IP/ATM | Legacy/ ATM |
|---|---|---|---|---|---|
| 44 | 58% | 84 | | 106 | |
| 552 | 21% | 592 | | 636 | |
| 576 | 3% | 616 | | 689 | |
| 1500 | 18% | 1540 | | 1696 | |
| | | IP Weighted Mean | | | |
| 429 | | 469 | | 521 | |
| Legacy Traffic ATM AAL1 & AAL2 | 20% | | 68 | | 53 |
| | | Total Weighted Mean | | | |
| | | MPLS Core 389 | | ATM Core 429 | |

For links of OC12/STM4 and above, then frames of 1500 bytes do not cause significant delay variation for short real-time packets.

The arrangement and method described above provide a network model in which:—

ATM is used for low or medium capacity access e.g. xDSL, third generation wireless and T1/E1 leased-lines, frame-mode is used for access to corporate sites, frame-mode is used for core transport.

This provides a better match for emerging technologies than a MSF model which seeks to impose ATM for all core applications. A comparison of the adaptation and switching plane functions for the ATM and MPLS core network options is illustrated in FIGS. 9a to 9d.

FIGS. 9a to 9d shows comparisons between adaptation and switching plane functions for preferred embodiments of the invention (FIGS. 9a and 9b) and for legacy networks (FIGS. 9c and 9d). the figures illustrate comparisons of the adaptation and switching plane functions for ATM and MPLS core networks and show the reduction in management complexity provided by the arrangement and method described above.

It will be understood that the above description of a preferred embodiment is given by way of example only and that various modifications may be made by those skilled in the art without departing from the spirit and scope of the invention.

The invention claimed is:

1. A communications multi-service network comprising: a plurality of nodes interconnected via a plurality of quality of service capable tunnels and incorporating a frame-mode MPLS architecture in which IP services are run directly over a frame-based core part of said multi-service network and legacy services are run over ATM adaptations and emulated ATM services on said core part of the network, the multi-service network further comprising one or more virtual switches for switching data traffic, each virtual switch comprising managed switching resources from a number of said interconnected nodes.

2. A frame-mode switching communications network comprising: a plurality of core nodes establishing a multi-service transport network; a plurality of service nodes each coupled to a core node to provide access to the transport network; and a network management system arranged to define and manage one or more virtual public/private networks within said communications network, wherein groups of said core nodes are configured as abstract nodes within which any available path can be selected to achieve a requested connection, wherein an end to end label switched path is established via the management system by specifying a number of abstract nodes between two specified service nodes.

3. A communications network as claimed in claim 2, wherein each end to end path is specified by identifying first and second service nodes and one or more abstract nodes therebetween.

4. A communications network as claimed in claim 3, wherein a virtual public/private network (VPN) is defined with multiple stages of first level constraint-based routed label switched paths.

5. A communications network as claimed in claim 4, wherein each abstract node is defined by an IP address prefix, and all core nodes which include that prefix in their IP address are part of that abstract node.

6. A communications network as claimed in claim 5, incorporating a super-ordinate management function arranged to control creation, modification and deletion of virtual switches.

7. A communications network as claimed in claim 6, wherein said super-ordinate manager is adapted for defining virtual private/public networks (VPN) and for placing traffic trunks to realize those VPNs.

8. A communications network as claimed in claim 7, incorporating a sub-ordinate management function arranged to provide virtual switch management.

9. A communications network as claimed in claim 8, wherein a sub-network manager is responsible for constructing an abstract node information model representation of the network which it passes to a super-ordinate manager.

10. A method of operating a communications multi-service network comprising: interconnecting a plurality of nodes via a plurality of quality of service capable tunnels such that said nodes incorporate a frame-mode MPLS architecture using ATM for low or medium capacity access and core transport of legacy services on a frame based core part of said multi-service network; and using frame mode for corporate user access and for other core transport on said frame based core part of said multi-service network; the method further comprising using one or more virtual switches to switch data traffic, each virtual switch comprising managed switching resources from a number of said interconnected nodes.

11. A method of operating a frame-mode switching communications multi-service network comprising a plurality of core nodes establishing a multi-service transport network, including a plurality of service nodes each coupled to a core node in which access to the transport is provided, and having a network management system arranged to define and manage one or more virtual public/private networks within said communications network, the method comprising: configuring groups of said core nodes as abstract nodes within which any available path can be selected to achieve a requested connection, and wherein an end to end label switched path is established via the management system by specifying a number of abstract nodes between two specified service nodes.

12. A method as claimed in claim 11, wherein each end to end path is specified by identifying first and second real nodes and one or more abstract nodes therebetween.

13. A method as claimed in claim 12, wherein a virtual public/private network (VPN) is defined with multiple stages of first level constraint-based routed label switched paths.

14. A method as claimed in claim 13, wherein each abstract node is defined by an IP address prefix, and all core nodes which include that prefix in their IP address are part of that abstract node.

15. A method as claimed in claim 14, including creation, modification and deletion of virtual switches via a super-ordinate management function.

16. A method as claimed in claim 15, wherein said super-ordinate manager is adapted for defining virtual private/public networks (VPN) and for placing traffic trunks to realise those VPNs.

17. A method as claimed in claim 16, wherein ATM is used for low or medium capacity access, and wherein frame-mode is used for access to corporate sites and for core transport.

18. A communications network comprising: a plurality of core nodes establishing a transport network; a plurality of service nodes each coupled to a core node to provide access to the transport network; and a network management system arranged to define and manage one or more virtual public/private networks within said communications network, wherein groups of said core nodes are configured as abstract nodes within which any available path can be selected to achieve a requested connection, and wherein an end to end label switched path is established via the management system by specifying a number of abstract nodes between two specified service nodes;
- wherein a virtual public/private network (VPN) is defined with multiple stages of first level constraint-based routed label switched paths;
- wherein each abstract node is defined by an IP address prefix, and all core nodes which include that prefix in their IP address are part of that abstract node;
- the communications network incorporates a super-ordinate management function arranged to control creation, modification and deletion of virtual switches; and
- wherein said super-ordinate manager is adapted for defining virtual private/public networks (VPN) and for placing traffic trunks to realise those VPNs.

19. A communications network as claimed in claim 18, incorporating a sub-ordinate management function arranged to provide virtual switch management.

20. A communications network as claimed in claim 19, wherein a sub-network manager is responsible for constructing an abstract node information model representation of the network which it passes to a super-ordinate manager.

21. A method of operating a communications multi-service network comprising a plurality of core nodes establishing a multi-service transport network, including a plurality of service nodes each coupled to a core node in which access to the transport is provided, and having a network management system arranged to define and manage one or more virtual public/private networks within said communications network, the method comprising:
- configuring groups of said core nodes as abstract nodes within which any available path can be selected to achieve a requested connection;
- establishing an end to end label switched path via the management system by specifying a number of abstract nodes between two specified service nodes;
- specifying each path by identifying first and second service nodes and one or more abstract nodes therebetween;
- defining a virtual public/private network (VPN) with multiple stages of first level constraint-based routed label switched paths;
- defining each abstract node by an IP address prefix, and including all core nodes which include that prefix in their IP address as part of that abstract node;
- the method including creation, modification and deletion of virtual switches via a super-ordinate management function; and
- wherein said super-ordinate manager is adapted for defining said virtual private/public networks (VPN) and for placing traffic trunks to realise those VPNs.

22. A method as claimed in claim 21, wherein ATM is used for low or medium capacity access, and wherein frame-mode is used for access to corporate sites and for core transport.

* * * * *